United States Patent [19]

Isenhath

[11] Patent Number: 4,991,219
[45] Date of Patent: Feb. 5, 1991

[54] SOUND SIMULATION CHAMBER

[76] Inventor: John Isenhath, 1020 N. Augusta St., Staunton, Va. 24401

[21] Appl. No.: 462,211

[22] Filed: Jan. 9, 1990

[51] Int. Cl.⁵ .............................................. H04R 1/02
[52] U.S. Cl. ...................... 381/90; 381/205; 381/188; 181/30
[58] Field of Search ............... 181/30, 295; 381/24, 381/87, 88, 90, 205, 188

[56] References Cited

U.S. PATENT DOCUMENTS

| | | | |
|---|---|---|---|
| 239,826 | 5/1886 | Wheeler | D25/99 |
| 284,605 | 7/1986 | Swanson et al. | D24/39 |
| 329,909 | 11/1885 | Johnson | . |
| 1,238,228 | 8/1917 | Weil | 181/30 |
| 1,908,661 | 5/1933 | Foltz | . |
| 1,966,288 | 7/1934 | Foltz | . |
| 2,141,117 | 12/1938 | Weiss | 189/2 |
| 2,581,251 | 1/1952 | Glazer et al. | 179/1 |
| 3,144,513 | 8/1964 | Sherron | 179/1 |
| 3,237,713 | 3/1966 | Leslie | 181/31 |
| 3,694,974 | 10/1972 | Eckel | 18/172 |
| 3,826,250 | 7/1974 | Adams | 128/24.2 |
| 3,959,607 | 5/1976 | Vargo | 179/183 |
| 4,107,461 | 8/1978 | Bose | 381/24 |
| 4,475,226 | 10/1984 | Greenberg | 381/87 |
| 4,683,591 | 7/1987 | Dawson et al. | 381/85 |

OTHER PUBLICATIONS

G. Meeks, "The Church that Rocks and Rolls", J. Aud. Eng. Soc. vol. 32, No. 6, 1984 Jun.

*Primary Examiner*—Forester W. Isen
*Attorney, Agent, or Firm*—Charles L. Lovercheck; Wayne L. Lovercheck

[57] ABSTRACT

A sound simulation chamber having a top, lower edge, and sides with speakers attached to the inside surface of the sides near the lower edge, front and rear. The speakers are mounted so that they can be oriented in any of several directions so that an auditory effect can be had to accommodate different head positions, such as sitting, standing and reclining. The speakers can also be adjusted for adults and children. An auditory effect is created by (1) placement of speakers all around the subject, (2) strategic positioning of each speaker in relation to the subject's head to refine the effect mechanically and (3) sound is synchronized by the taping of the sound source and/or by switching the individual speakers manually or electronically.

11 Claims, 2 Drawing Sheets

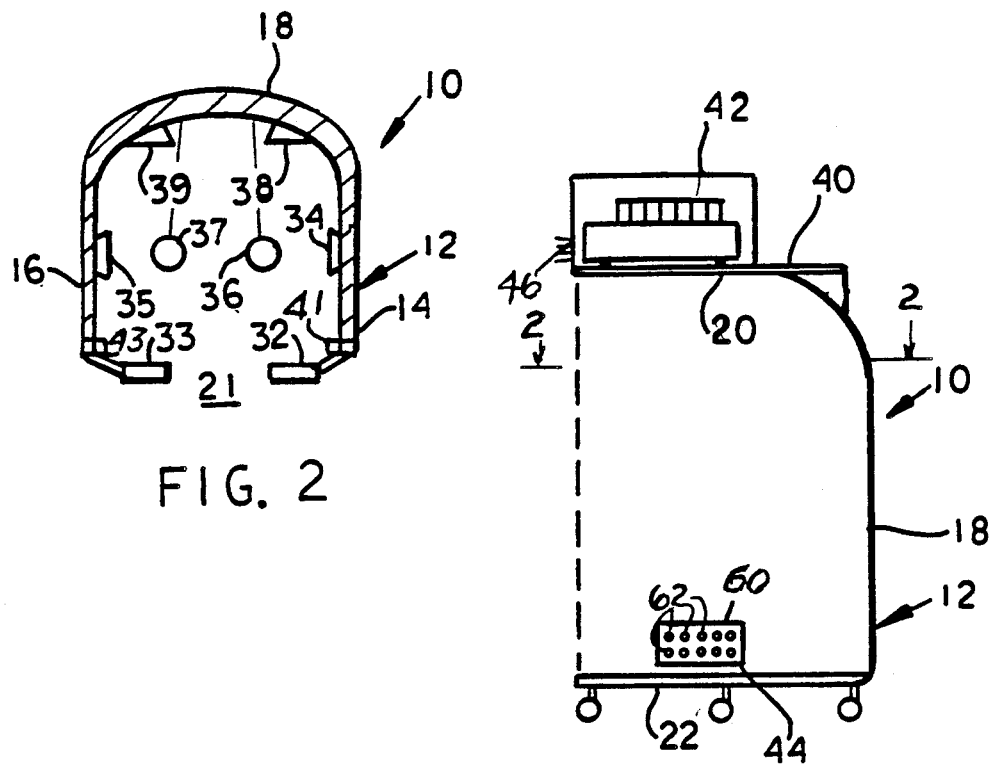
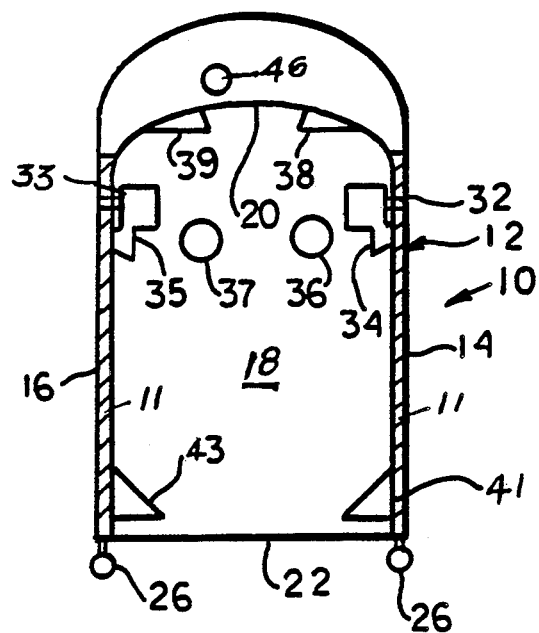

SOUND SIMULATION CHAMBER

GENERAL STATEMENT OF THE INVENTION

The purpose of the sound simulation chamber is to serve as an effective auditory environment to condition both hearing and listening performance in achieving maximum potential and to operate more effectively under difficult listening situations. While a hearing aid historically is intended to assist a person to hear more sound, one role of the chamber is to train the ears to use that louder sound again. Another fundamental role of the chamber is to recover one's natural orientation to sound by duplicating real-life listening conditions.

BACKGROUND OF THE INVENTION

Specific applications where there is a need for sound simulation chambers includes an apparatus to improve the success ratio of auditory adjustment of persons to accept and adjust to hearing aids for the first time. To improve the functional utility of hearing aids for long-time users by building stronger tolerance levels and reducing the negative consequences of chronic noise tolerance problems, as the result of the condition known as "recruitment"; to enhance over-all hearing performance by correcting listening deficiencies for persons with normal hearing who experience below average hearing performance; desensitizing to ear noise; to reduce subjective awareness of annoying ear noise for tinnitus sufferers; improve auditory discrimination by conditioning the ears to block out unwanted background noise, improving word understanding abilities, modifying the perceived signal and noise ratios that will maximize hearing concentration levels thereby instilling greater self-confidence when in difficult hearing situations.

Localization skills are developed. The directional features of the chamber produces the ideal conditions for retraining a person recovering from unilateral (one ear) hearing loss to regain synchronized binaural hearing, the ability to hear effectively with both ears. It trains the ears to locate either fixed or moving sound sources.

Related applications for a sound simulating chamber are: screen hearing, sound field testing, including hearing aid evaluations, diagnostic assessment of subjective listening skills, performing basic hearing evaluation (with head phones) and demostrating the natural benefits of binaural hearing.

The device disclosed herein enables the operator to reproduce under controlled conditions, sensory (auditory/visual) phenomena likely to occur in actual performance. The simulator provides a unique opportunity to learn, experience and practice dealing with sensory input within a targeted situation without the risk of negative consequences or the pressure of potential failure.

Potential users of the simulation chamber include audiologists, hearing therapists, speech pathologists, physicians, hearing aid dealers, psychologists and teachers of the blind.

Technical features of the chamber include ten speakers with wide band frequency which could have 5 watts, 8 ohms, be 5 inches in diameter, individually fused with ¼ inch phone jacks, a control panel with individually controlled speakers, stereo, mono and directional capacity, sound capacity and slide projector connected to the control panel.

The horizontal and vertical movement capacities of the speakers enables each speaker to be angled in relation to the subject's specific orientation within the chamber. The maneuverability is an important contribution because acoustic direction depends on the way a sound enters the ear.

Some of the functions possible with rotational speakers include (1) adjustment of speaker orientation to accommodate different head positions such as sitting upright versus reclining, (2) speaker adjustment for adults versus children, and (3) direct versus indirect sound placement in relation to the subject.

OBJECTS OF THE INVENTION

It is an object of the invention to provide an enclosure covered with a dome modeled after the acoustic characteristics of an amphitheater.

Another object of the invention is to provide an acoustical chamber to stimulate virtually any conceivable auditory environment required for diagnostic or therapeutic purposes.

Another object of the invention is to provide a multidirectional acoustical field.

Another object of the invention is to provide a chamber having individually controlled speakers with symmetrially arranged acoustically directed formation enabling the chamber to create moving or traveling auditory signals.

Another object of the invention is to provide individually controlled speakers in an acoustical chamber that are strategically placed to literally surround a patient in sound.

Another object of the invention is to provide an acoustical chamber which has the ability to synchronize visual images with auditory images, utilizing both major human senses.

Another object of the invention is to provide an acoustical chamber having a plurality of speakers mechanically adjusted universally as to direction.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit of sacrificing any of the advantages of the invention.

BRIEF DESCRIPTION OF THE DRAWINGS

FIG. 1 is a side view of the simulation chamber according to the invention.

FIG. 2 is a top view of the chamber with the top removed.

FIG. 3 is a front view of the chamber according to the invention.

DETAILED DESCRIPTION OF THE DRAWINGS

Figure 6:
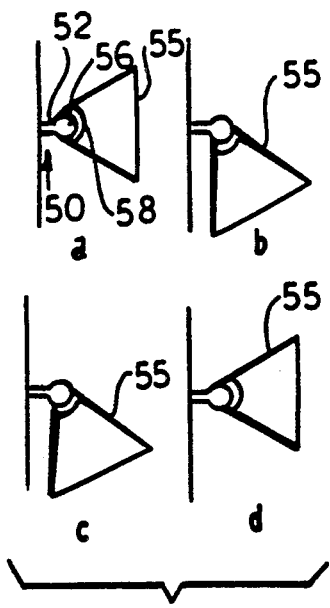
FIG. 6 is a schematic view showing a particular speaker adjusted to several selected positions.
Figure 4:
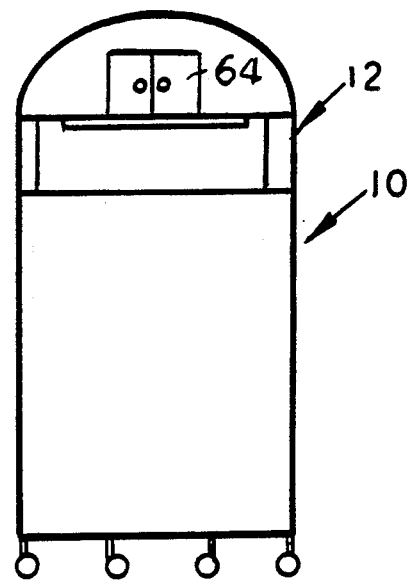
FIG. 4 is a back view of the chamber according to the invention.
Figure 7:
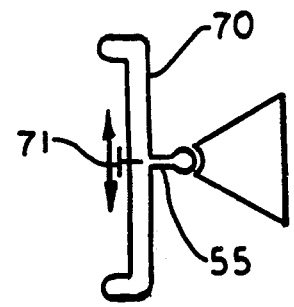
FIG. 7 is a detailed view of an alternative arrangement of some of the speakers.
Figure 5:
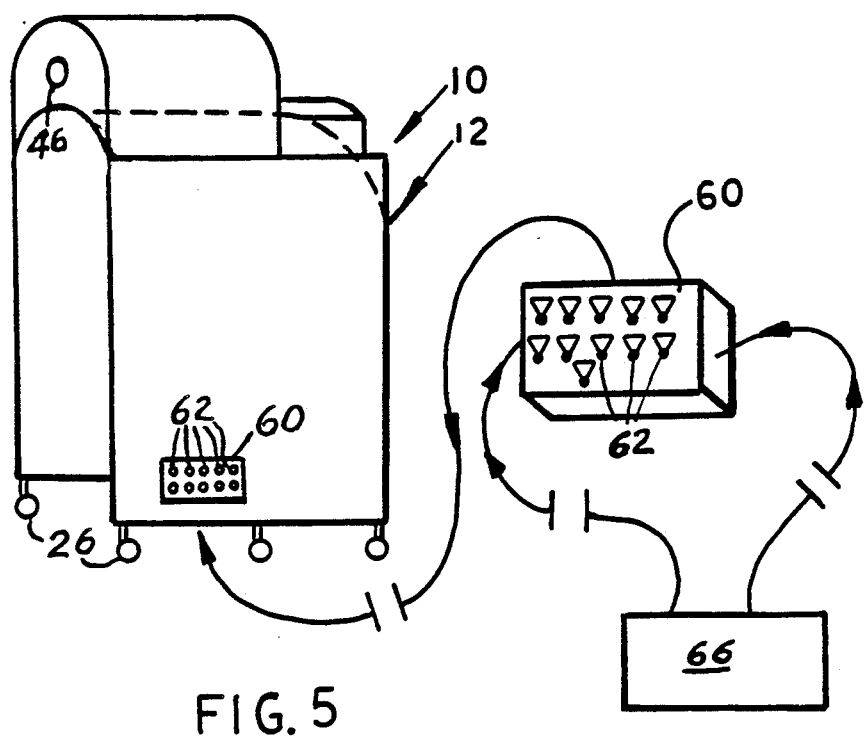
FIG. 5 is an isometric view of the chamber according to the invention.

Now with more particular reference to the drawings, a sound simulation chamber 10 is shown which comprises enclosure 12. The interior surfaces of the walls of chamber 10 are covered with acoustical material 11 with minimum sound reflective properties. Enclosure 12 has first side 14, second side 16, circular back wall 18, domed top 20, lower edge 22 and open front 21. Caster wheels 26 are attached to the bottom of lower edge 22. Back wall 18 and top 20 are generally cylindrical to simulate an ampitheater. As an alternative, the chamber could include a floor attached to lower edge 22 to support a patient sitting in an ordinary chair. Lower edge 22, of FIG. 1, could refer to such a floor.

A plurality of speakers 55 are mounted inside enclosure 12. These speakers comprise first retractable front speaker 32 which is supported on first side 14 adjacent front 21 and second retractable front speaker 33 which is supported on second side 16 adjacent front 21 by a retractable support means which could be a slot receiving a bolt and nut of a type familiar to those skilled in the art. First side speaker 34 is supported on first side 14 about three fourths way to top 20 and second side speaker 35 is supported on second side 16 about three fourths of the way to top 20. First back intermdiate speaker 36 is supported on back wall 18 by bracket 50 about three fourths of the way from lower edge 22 to top 20 and second back intermediate speaker 37 is attached to back wall 18 by bracket 50 and spaced laterally from first back intermediate speaker 36 at the same distance from top 20 and back wall 18. First back top speaker 38 is attached to top 20 and adjacent back wall 18 by bracket 50 and second back top speaker 39 is spaced from first back top speaker 38 and attached to back wall 18 adjacent top 20 by bracket 50. First base speaker 41 and second base speaker 43 are attached to first side 14 and second side 16 adjacent lower edge 22 by brackets 50.

Shelf means 40 supports slide projector 42 and both shelf 40 and slide projector 42 are supported on top 20 in an enclosure closed by doors 64. Slide projector 42 has conventional lens 46 to project an image in connection with sound from the speakers. Control panel 60 is supported on said first side 14 adjacent lower edge 22 outside the chamber 10.

Speakers 55 are each mounted on chamber 10 by means of ball and socket universal joint brackets 50, as shown in FIG. 6, with each speaker attached to socket 58. Speakers 55 can then be either manually or electronically adjusted. Socket 58 receives stationary ball 56 and allows each speaker rotary motion in all directions within the limits, of, for example, 60 degrees. Thus sound direction value and quality can be simulated to a person sitting in chamber 10.

Each bracket 50 is made up of ball 56, attached to a wall on chamber 10 by means of stem 52, or the like. Socket 58 will be attached to speakers 55 in a suitable manner, familiar to those skilled in the art. Speakers 55 will be adjustable universally from position a on the horizon or straight out, position b, about 60° up, position c, 60° below horizontal and laterally to right 60°, also to left 60°. Preferably, suitable control panel 60 will be connected to speakers 55 by control panel 60 to actuate individual speakers connected to individual switches 62 connected to sound source 66 to give the desired acoustical environment for the patient being treated.

In order to obtain the maximum adjustment capability of speakers 55, in addition to ball and socket universal joint brackets 50, selected speakers 55 could also be mounted to rails 70 that would allow speaker 55 to slide along rail 70 to a desired location. Rail 70 would extend from one post or corner support to another and enable speaker 55 to be moved within the spatial limits of rail 70 and in relation to the head of the patient in the chamber. In this way, it is rail 70, not speaker 55 that would be directly attached to the chamber wall. The length of rail 70 would determine the distance of possible adjustment. A speaker could be locked by lock 71 into place and once done so, speaker 55 could then be further adjusted by using the ball and socket shown in FIG. 6 for a more refined rotary position. This two-way adjustment capability could enhance the flexibility and spatial positioning of the speakers within the chamber. One obvious benefit is greater precision of sound placement, accommodating different sizes ranging from the small child to the infant held by its mother to a tall adult. The third comment refers to control panel 60. While the concept of individually controlled speakers with individually controlled switches remains as originally developed, the actual way to accomplish the task remains a mystery.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exlusive property or privilege is claimed are defined as follows:

1. A sound simulation chamber comprising an enclosure, said enclosure having a first side, a second side, a back wall in the shape of a part of a cylinder, a domed top, a lower edge and an open front, a plurality of speakers mounted inside said enclosure, said speakers being wide band frequency speakers, individual control means for at least some of said speakers whereby an operator can reproduce auditory sound likely to occur in active real-life hearing situations, a first retractable front speaker supported on said first side of said enclosure adjacent said open front, a second retractable front speaker supported on said second side of said enclosure adjacent said open front, retractable means supporting said first retractable front speaker and said second retractable front speaker, a first side speaker supported on said first side of said enclosure about three fourths distance from said lower edge to said top, a second side speaker supported on said second side about three fourths distance from said lower edge to said top, a first intermediate back speaker and said second intermediate back speaker being attached to said back wall spaced from said top and from said first side and said second side, a first back top speaker attached to said back wall of said enclosure adjacent said top adjacent said front, a second back top speaker attached to said back wall adjacent said top and adjacent said open front, a shelf means supported on said top, a slide projector supported on said top, a control panel supported on said first side adjacent said lower edge.

2. The chamber recited in claim 1 wherein caster wheels [26] are attached to said chamber [11] for supporting said chamber.

3. The chamber recited in claim 1 wherein at least one rail [70] is attached to said chamber and extends parallel and spaced from said wall [12], and at least one of said speakers [55] is slidably supported on said rail whereby said speaker can be adjusted along said rail, and means to lock said speaker in position on said rail [70].

4. The chamber recited in claim 1 wherein said speakers are each mounted on a bracket [50], said brackets each comprise a ball [56] fixed to said chamber and a socket member [58] receiving said ball and said bracket fixed to said speakers [55].

5. The chamber recited in claim 1 wherein each said speaker is movable to incline to about 60 degrees up, 60 degrees down, 60 degrees to the left or 60 degrees to the right from a central position.

6. The chamber recited in claim 1 wherein individual switches [62] are provided, each said switch being connected to one of said speakers for connecting a said speaker to a source of electrical energy for providing sound from said speaker.

7. The chamber recited in claim 6 wherein said chamber has sides and a back, said speakers being supported on said sides and on said back.

8. The chamber recited in claim 7 wherein some of said speakers are adjustably supported on said sides by means of brackets whereby said speakers may be directed in various directions.

9. The chamber recited in claim 8 wherein said brackets comprise a ball and socket connection.

10. The chamber recited in claim 9 wherein said ball is supported on said sides and said socket is supported on said speaker.

11. A sound simulation chamber comprising an enclosure, said enclosure having a first side, a second side, a back wall in the shape of a part of a cylinder, a domed top, a lower edge and an open front, a plurality of speakers mounted inside said enclosure, said speakers being wide band frequency speakers, individual control means for at least some of said speakers whereby an operator can reproduce auditory sound likely to occur in active real-life hearing situations, a plurality of casters are attached to said chamber adjacent said lower edge whereby said chamber may be moved to a patient sitting in an ordinary chair, whereby said chamber can be moved to encircle a patient seated in said chair.

* * * * *